3,395,997
METHOD OF TREATING GLASS TO REDUCE HELIUM PERMEATION

Paul J. Bryant, Prairie Village, Kans., and Charles M. Gosselin, Kansas City, Mo., assignors to Midwest Research Institute, Kansas City, Mo., a corporation of Missouri
No Drawing. Filed June 29, 1965, Ser. No. 468,125
11 Claims. (Cl. 65—30)

ABSTRACT OF THE DISCLOSURE

Glass vessels or other glass articles are rendered highly resistant to helium permeation by treating one of the surfaces thereof with cesium.

---

The invention described herein was made in the performance of work under a NASA contract and is subject to the provisions of the National Aeronautics and Space Act of 1958, Public Law 85–568 (72 Stat. 426; 42 U.S.C. 2451), as amended, and relates to a method of reducing the permeation of glass by atmospheric helium or a concentration of helium gas, in order to render the glass capable of supporting a high vacuum for an indefinite period of time.

The permeation of helium through glass has become an important consideration in the design and construction of ultra-high vacuum equipment capable of simulating the environment of outer space. Since helium gas molecules are monatomic, the physical size of the molecule is less than the molecular size of the other atmospheric gases. It has been found that the helium gas molecule is sufficiently small to penetrate the silicon dioxide lattice of a glass vessel employed in a high vacuum system; thus, this phenomenon places a definite limitation on the minimum pressure obtained in such a system.

Furthermore, in applications where a partial vacuum is utilized to lower heat transfer, this same phenomenon again places a limitation on the utilization of vacuum heat transfer reduction techniques. This is particularly true in the storage and transportation of helium in liquid helium dewars. During warming of the helium in the dewar, the helium is converted into the gaseous state and, after complete conversion of the dewar contents and attendant warming of the dewar, is then free to penetrate the walls of the dewar vacuum jacket, thereby ultimately filling the jacket to a sufficient concentration to render the dewar incapable of maintaining a sufficient thermal gradient across its wall structure.

It is, therefore, the object of the instant invention to provide a method of treating glass to render the same less subject to helium permeation when the glass is utilized to maintain a pressure difference between an evacuated region and a region containing atmospheric helium or a concentration of helium gas.

The method of this invention will first be described in its application in the sealing of ultrahigh vacuum systems against the helium permeation phenomenon discussed above. Such systems create extreme vacuum of the order of $10^{-9}$ torr and below, and comprise, essentially, a glass vacuum vessel communicating with the intake of a suitable pump. Helium permeation of the walls of the vessel commences as the partial vacuum is established and becomes significant as the pressure in the vessel is reduced to $10^{-12}$ torr and below, thereby placing an ultimate lower limit on the pressure obtainable within the vessel.

In the treatment of the instant invention, a source of cesium is communicated with the vessel by any suitable means. The cesium source may comprise any one of a number of decomposable cesium compounds capable of yielding cesium upon decomposition thereof. Such compounds, generally speaking decompose at elevated temperatures well above room temperature, and thus must be heated in order to effect release of the cesium.

For convenience in handling the decomposable compound and applying heat thereto, the compound may be placed in a glass vessel which is communicated with the primary pressure vessel by glass tubing. The pressure in both of the vessels will thus be reduced by the action of the vacuum pump. After the pump is placed in operation for a sufficient period of time to lower the pressure in the system to create a high vacuum condition, heat is applied to the compound containing vessel and the temperature of the compound is elevated to the decomposition level to thereby produce cesium in the gaseous state. Due to the extremely low pressure in the system, the cesium atoms have high mobility and readily travel throughout the system.

When the cesium vapor comes into contact with the inner surface of the primary vacuum vessel, it is believed that the cesium reacts with the hydroxyl groups on the glass surface to form cesium oxide with attendant release of hydrogen gas. It is further theorized that the cesium atom is of sufficient physical size to form compounds which effectively block the spaces between the silicon dioxide tetrahedra of the glass crystalline structure, thereby rendering the glass resistant to permeation by helium gas molecules. It should be understood however, that the foregoing is entirely a theoretical explanation of the action of the cesium which produces the results achieved by the instant invention, and that the theoretical analysis is not intended in any way to limit the process herein described to any particular explanation of the manner in which the action of the cesium reduces helium gas permeation.

Several minutes of exposure of the internal surfaces of the glass vessel to the presence of the cesium is sufficient to complete the treatment. For laboratory vessels having a vacuum chamber volume of the order of one cubic foot, a few granules of cesium nitrate ($CsNO_3$) provide an adequate source of cesium upon decomposition. The exact time duration of exposure of the surface to the cesium, of course, is determined by the internal surface area of the vessel and the number of free cesium atoms produced by compound decomposition. Additionally, the secondary vessel containing the cesium compound, the tubing interconnecting the primary and secondary vessels, and the other surfaces of the system exposed to the cesium atoms add to the total surface area which is available for reaction with the cesium. Thus, cesium production by compound decomposition for a period of from 10 to 20 minutes should be effected to assure adequate exposure of the internal surface of the primary vessel.

During production of the cesium, heat should be applied to the primary vessel to raise the temperature of its internal surface to approximately 250° to 400° C. This increases the mobility of cesium on the surface of the glass and, it is believed, assists in establishing proper conditions for the reaction of the cesium with the crystalline glass structure.

After heating of the internal surface and subjecting the same to the cesium for the time period indicated above, the vessel is permitted to cool to room temperature. This terminates the process and the glass is now rendered highly resistant to helium permeation. Should it be desired to subsequently remove the affect of the treatment, this can be accomplished by heating the treated surface of the vessel to approximately 325° to 400° C. for several hours while a partial vacuum is maintained therein by the vacuum system. The cesium is driven from the surface and thereupon pumped from the vessel.

Other decomposable cesium compounds suitable for use in the instant process include $Cs_2CO_3$ and compounds of cesium and antimony including $Cs_3Sb$. Any other decomposable cesium compound capable of producing cesium upon decomposition thereof is also suitable. Cesium nitrate, however, is particularly adaptable for use in the instant process due to its commercial availability and its temperature of decomposition.

Cesium nitrate ($CsNO_3$) has a melting point of 414° C. and decomposes above this temperature. Pyrex glass is commonly utilized in applications for glassware which must be heat resistant, it being common practice in ultrahigh vacuum system technology to bake out Pyrex vacuum vessels before utilizing the same to provide a vacuum chamber for analytical studies. At the pressures attained in such systems, Pyrex glass is capable of withstanding a temperature of 425° C. without distorting due to the pressure differential across the wall of the vessel. The purpose of bakeout is to free gas molecules which are adsorbed on the glass surfaces of the system. Thus, utilizing cesium nitrate as the cesium source in the present process, both bakeout of the Pyrex glass and production of cesium for reaction with the internal surfaces of the vacuum vessel may be achieved in the same operation by heating the system to 400° C. for several hours to effect bakeout of the glass components thereof, and then raising the temperature of the compound containing secondary vessel to 425° C. for the time prescribed above, since decomposition of cesium nitrate occurs above 414° C. After cesium exposure, the system is permitted to cool to room temperature.

If other decomposable cesium compounds are utilized, attention must be directed to the necessary heat which must be applied to the compound to effect decomposition thereof. Since the secondary vessel which serves as the cesium source and the primary vacuum vessel under treatment may be physically separated from one another in the vacuum system, it will be appreciated that the temperatures of the primary vessel and the secondary vessel may be readily maintained at substantially different levels if the decomposition temperature of the compound is incompatible with the bakeout temperature of the glass.

The process set forth above is readily adaptable to the treatment of the surfaces of glassware of various types and configurations. A Vycor glass diffuser or the vacuum jacket of a liquid helium dewar, for example, could be disposed within a vacuum chamber and subjected to the treatment of the instant invention by communicating the vacuum system with a source of cesium, since the surfaces of the articles in the chamber will be subjected to the cesium as well as the internal chamber walls. Alternatively, in the case of dewar vacuum jackets, the treatment may be effected during fabrication of the jacket and evacuation of the interior thereof by introducing cesium into the jacket interior trough the vacuum system utilized to evacuate the jacket.

Other examples of glasses which may be treated by the instant process include Vycor glass mentioned above and quartz glass, both of these substances being capable of withstanding considerably higher temperatures than Pyrex glass without distorting in an ultrahigh vacuum system. Although Vycor glass may be utilized in the high vacuum art as a helium diffuser, the diffusion capability of Vycor glass, after the cesium treatment of the instant invention, is reduced by a factor of approximately 1000 at room temperature.

Having thus described the invention, what is claimed as new and desired to be secured by Letters Patent is:

1. A method of treating a glass member, without substantially altering its bulk physical properties, to reduce helium permeation of the member when the latter is utilized to maintain a pressure difference across a pair of surfaces thereof bounding an evacuated region and a helium-containing region of higher pressure, said method comprising the steps of:

subjecting one of said surfaces to cesium; and
maintaining said one surface in contact with the cesium for a sufficient period of time to bond the cesium thereto and block at least a substantial number of the spaces in the molecular structure of the member, whereby to increase the resistance of the member to said permeation.

2. The method as set forth in claim 1, wherein is provided the additional steps of:

raising the temperature of said one surface to a level substantially above room temperature; and
maintaining the temperature of said one surface at said level while the one surface is being subjected to said cesium.

3. A method of treating a glass member, without substantially altering its bulk physical properties, to reduce helium permeation of the member when the latter is utilized to maintain a pressure difference across a pair of surfaces thereof bounding an evacuated region and a helium-containing region of higher pressure, said method comprising the steps of:

establishing a partial vacuum in a zone bounded by one of said surfaces; and thereafter
subjecting said one surface to cesium; and
maintaining said one surface in contact with the cesium for a sufficient period of time to bond the cesium thereto and block at least a substantial number of the spaces in the molecular structure of the member, whereby to increase the resistance of the member to said permeation.

4. A method of treating a glass member, without substantially altering its bulk physical properties, to reduce helium permeation of the member when the latter is utilized to maintain a pressure difference across a pair of surfaces thereof bounding an evacuated region and a helium-containing region of higher pressure, said method comprising the steps of:

vaporizing cesium from a source thereof;
subjecting one of said surfaces to the cesium vapor; and
maintaining said one surface in contact with the vapor for a sufficient period of time to bond the cesium thereto and block at least a substantial number of the spaces in the molecular structure of the member, whereby to increase the resistance of the member to said permeation.

5. The method as set forth in claim 4, wherein the step of vaporizing cesium includes decomposing a decomposable cesium compound capable of producing the cesium vapor upon decomposition thereof.

6. The method as set forth in claim 4, wherein the step of vaporizing cesium includes heating $CsNO_3$ to at least the temperature of decomposition thereof to produce the cesium vapor.

7. The method as set forth in claim 4, wherein the step of vaporizing cesium includes heating $Cs_2CO_3$ to at least the temperature of decomposition thereof to produce the cesium vapor.

8. The method as set forth in claim 4, wherein the step of vaporizing cesium includes heating $Cs_3Sb$ to at least the temperature of decomposition thereof to produce the cesium vapor.

9. A method of treating a glass member, without substantially altering its bulk physical properties, to reduce helium permeation of the member when the latter is utilized to maintain a pressure difference at temperatures of approximately room temperature and below across a pair of surfaces thereof bounding an evacuated region and a helium-containing region of higher pressure, said method comprising the steps of:

establishing a partial vacuum in a zone bounded by one of said surfaces;
heating a decomposable cesium compound in said zone to at least the temperature of decomposition thereof to thereby produce cesium vapor;

heating said one surface to raise the temperature thereof to a level substantially above room temperature;

maintaining said compound in a heated, cesium-producing state for a sufficient period of time to permit dispersion of the vapor in said zone and contact of the vapor with the heated surface to cause the cesium to bond thereto and block at least a substantial number of the spaces in the molecular structure of the member; and thereafter returning the heated surface to approximately room temperature.

10. The method as set forth in claim 9, wherein the temperature level to which said one surface is heated is approximately 250° to 400° C.

11. An article of manufacture comprising a glass member treated in accordance with the method of claim 1.

References Cited
UNITED STATES PATENTS

| | | | |
|---|---|---|---|
| 3,012,902 | 12/1961 | Bayer | 65—30 |
| 3,063,788 | 11/1962 | Veazie | 117—124 |
| 3,198,650 | 8/1965 | Stilley et al. | 117—124 |
| 3,258,521 | 1/1966 | Francel et al. | 65—60 |
| 3,323,889 | 6/1967 | Carl et al. | 65—60 |

OTHER REFERENCES

Norton: "Helium Diffusion Through Glass," J. of Amer. Cer. Soc., vol. 36 No. 3, March 1953, (pp. 90–96).

S. LEON BASHORE, *Acting Primary Examiner.*

F. W. MIGA, *Assistant Examiner.*